United States Patent [19]

Kesten et al.

[11] Patent Number: 4,850,859
[45] Date of Patent: Jul. 25, 1989

[54] LIQUID FUELED HYDROGEN HEATER

[75] Inventors: Arthur S. Kesten, West Hartford; H. Ezzat Khalifa, South Windsor, both of Conn.

[73] Assignee: United Technologies Corporation, Hartford, Conn.

[21] Appl. No.: 252,841

[22] Filed: Sep. 30, 1988

[51] Int. Cl.$^4$ .............................................. F24H 3/02
[52] U.S. Cl. ............................... 431/328; 126/110 R; 126/116 R; 126/263; 431/326; 432/222
[58] Field of Search .................... 126/45, 113, 110 C, 126/110 R, 116 R, 263; 431/326, 328; 432/222

[56] References Cited

U.S. PATENT DOCUMENTS

| | | | |
|---|---|---|---|
| 3,589,853 | 6/1971 | Guasco | 431/328 |
| 3,857,669 | 12/1974 | Smith et al. | 431/328 |
| 4,068,651 | 1/1978 | Rappaport | 431/328 |
| 4,614,176 | 9/1986 | Kesten | 126/110 R |
| 4,766,877 | 8/1988 | Jensen | 431/328 |

FOREIGN PATENT DOCUMENTS

| | | | |
|---|---|---|---|
| 56018 | 3/1984 | Japan | 431/328 |
| 29609 | 2/1986 | Japan | 431/328 |
| 769201 | 10/1980 | U.S.S.R. | 431/328 |

*Primary Examiner*—Ira S. Lazarus
*Assistant Examiner*—Christopher Hayes

[57] ABSTRACT

An apparatus for heating air using a regenerable hydrogen containing liquid fuel. The apparatus includes a hydrogen reduction catalyst, a semipermeable membrane through which hydrogen may pass and an oxidation catalyst which forms a combustion area. The hydrogen reduction catalyst is proximate to the combustion area. A displacement means transfers the hydrogen containing liquid fuel to the reduction catalyst where combustion heat decomposes the liquid fuel into hydrogen and decomposition products. The hydrogen passes through the semipermeable membrane mixes with air and is combusted at the oxidation catalyst. The decomposition products are transferred to a condensing means whereby they are condensed.

4 Claims, 1 Drawing Sheet

U.S. Patent
Jul. 25, 1989
4,850,859
FIG. 1
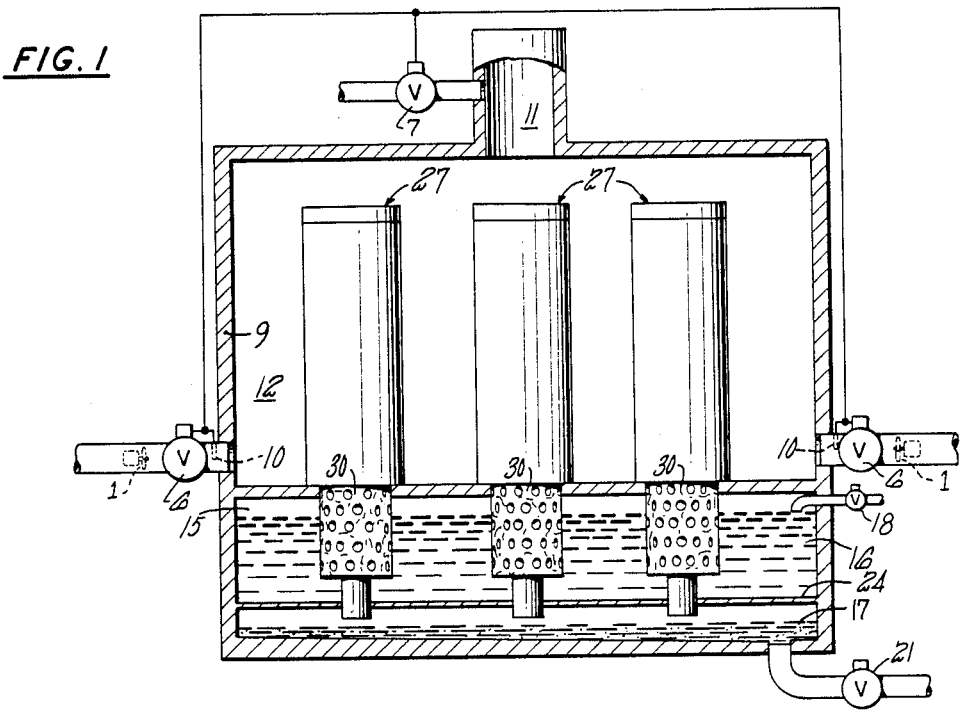
FIG. 2
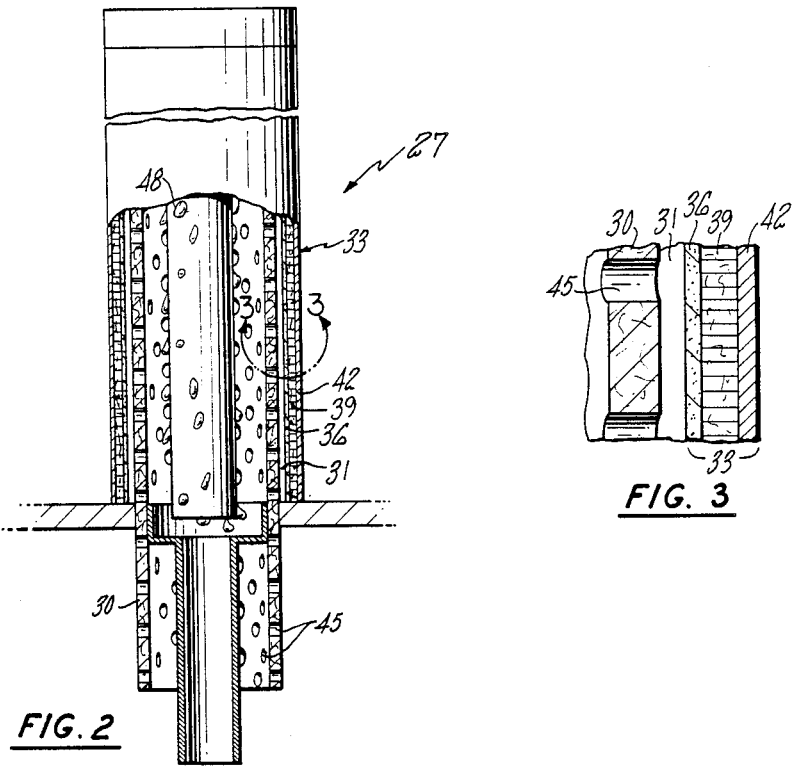
FIG. 3

LIQUID FUELED HYDROGEN HEATER

TECHNICAL FIELD

The field of art to which this invention pertains is heating systems, particularly space heating systems.

BACKGROUND ART

Energy management in buildings requires that indoor air be heated in cold weather to overcome losses due to heat conduction throughout the structure and convection due to leakage around windows, doors and other ports. Even with well insulated and tighter buildings, indoor air replacement is necessary to clear the air of pollutants formed from cooking, smoking, etc. Heating requirements can be reduced where outdoor air being brought in is heated by exchange with the indoor air being replaced. However, current heating methods are indirect; they involve burning a fuel at some central location, transferring the energy from that fuel to a fluid and a heat exchanger, and then transferring the energy from that fluid or secondary fluid through another heat exchanger to the air to be warmed. Alternative methods of heating using electricity are even less efficient.

Commonly assigned U.S. Pat. No. 4,614,176 describes an apparatus for heating air wherein hydrogen combustion is dispersed in direct proximity to a metal hydride fuel source in order that the combustion heat effects the release of the hydrogen from the metal hydride. The combustion area contains a catalyst and a semipermeable membrane separates the hydride fuel storage means and the combustion area. The temperature of the metal hydride is raised to effect initial release of hydrogen which passes through the semipermeable membrane, mixes with air and is combusted at the catalyst. The heat of combustion, in direct proximity to the metal hydride, perpetuates the hydrogen release. Although this system provides advantages, the metal hydrides can be heavy, expensive and require periodic replacement and regeneration.

Accordingly, there is a search in this art for apparatuses that do not rely upon metal hydride systems.

DISCLOSURE OF THE INVENTION

This apparatus is directed to an apparatus for heating air using a regenerable hydrogen containing liquid fuel. The apparatus includes a hydrogen reduction catalyst, a semipermeable membrane through which hydrogen may pass and an oxidation catalyst which forms a combustion area. The hydrogen reduction catalyst is proximate to the combustion area. A displacement means transfers the hydrogen containing liquid fuel to the reduction catalyst where combustion heat decomposes the liquid fuel into hydrogen and other decomposition products. The hydrogen passes through the semipermeable membrane mixes with air and is combusted at the oxidation catalyst. The other decomposition products are transferred to a condensing means whereby they are condensed.

Other features and advantage of the present invention will become apparent from the specification and claims and from the accompanying drawings which illustrate an embodiment of the invention.

BRIEF DESCRIPTION OF THE DRAWINGS

FIG. 1 is an schematic of an exemplary hydrogen heater of this invention.

FIG. 2 is a cross-section view of a reaction chamber of the hydrogen heater of FIG. 1, and FIG. 3 is an enlarged view taken at 3—3 of FIG. 2 of the reactor wall illustrated in FIG. 2.

BEST MODE FOR CARRYING OUT THE INVENTION

A clear understanding of this invention may be had by reference to FIG. 1 which illustrates an exemplary catalytic hydrogen space heater. In FIG. 1, fans 1 direct air through a conduit neck which lines an opening in the wall 9. The air passes through open valves 6 which are preferably throttle valves in order that it can regulate combustion, and into the mixing and distributing chamber 12. In addition, a valve 7 regulates the flow of air (oxygen) used for shutoff purposes described further on. Channel 11 directs the flow of heated humidified air. The channel 11 is lined with an oxidation catalyst used during shutdown.

A fuel storage means comprises a hydrogen containing liquid (e.g., organic liquid hydride further described below such as methylcyclohexane) fuel storage means. For example a container the liquid hydrogen containing fuel 16. A valve 18 regulates the hydrogen liquid feed to the container 15. A second valve 21 regulates the removal of condensed decomposition products 17 and residual methylcyclohexane. An optional partition 24 separates the condensed decomposition products 17 from the hydrogen containing liquid feedstock 16. Reactors 27 are in fluid communication with the hydrogen containing liquid fuel 16.

FIG. 2 illustrates a cross-section view of a reactor 27. A displacement means such as a wick 30 transfers the fuel 16 via a vapor space 31 to a wall means 33. Another displacement means such as openings 45 in the wick 30 are used to transfer the decomposition products 17 from the wall means 33 to a condensation means 48 such as a cold cylindrical surface. The wall means is depicted in an enlarged view in FIG. 3. The wall means 33 includes a dehydrogenation catalyst 36, semipermeable membrane 39 and an oxidation catalyst 42.

During operation the liquid fuel 16 is displaced along the wick 30. Vapor fuel 16 at the vapor pressure in equilibrium with the liquid fuel 16 at the wick 30 surface diffuses radially outward toward the dehydrogenation catalyst 36 where it decomposes into hydrogen and other decomposition products 17. The decomposition reaction keeps the fuel 16 partial pressure low at the catalyst 36 surface and provides the driving force for fuel 16 diffusion. The semipermeable membrane 39 allows passage of the hydrogen while inhibiting passage of the decomposition products 17. The hydrogen reacts with oxygen on the catalyst 42 surface attached to the outside surface of the membrane 39 to generate heat and water vapor. Warm humidified air exits the device. Typically, the heat released by the catalytic reaction warms the air to a range of about 60° C. to about 400° C. as it passes by the reactors 27 to the area to be heated. The air is also humidified, the extent of humidification being dependent, for example, upon the temperature the air is heated to. The temperature the air is heated to is a design parameter based on the application. By varying the membrane thickness and the oxygen throttle valve, the degree of combustion can be controlled.

The decomposition products 17 vapor migrates inward through the perforations 45 in the wick 30 toward a cold central surface 48 where it condenses. The condensate film mixes with the liquid fuel 16 or is collected in a separate container.

Start-up of the apparatus is accomplished by heating (e.g., electrically) the semipermeable membrane 39 to a temperature sufficient to effect dehydrogenation (in the case of methylcyclohexane above 370° C.). From that point on, the heat of the hydrogen/oxygen reaction is used to heat the membrane 39 and attached decomposition catalyst 36 and oxidation catalyst 42.

Reactor shutdown is accomplished by opening valve 7 and closing valves 6 to cut the air flow to the membrane 39 surface, thus cooling the surface and slowing down the release of the hydrogen. Residual hydrogen is oxidized by incoming air in the catalyzed exit channel 11 until the chamber 12 temperature drops to the point where hydrogen release is negligible. At this point, valve 7 is closed to cut the air supply off. Although there is no restriction in the chambers 12 which would inhibit the transfer of air, air is inhibited during normal operation from passing from the area to be heated through the chambers because of the greater pressures inside the heater during operation. When the pressure differential drops enough to allow air to enter, the reactor 27 has cooled to a state where hydrogen is not being released and so the entrance of air is not a significant problem.

In an emergency shutoff system a thermocouple 10 are connected to incoming air valves 6. When the thermocouple 10 senses that the temperature of the apparatus is rising above safe levels, it sends a command to the entry valve 6 closing the valve and eliminating the source of oxygen, thus effectively closing the combustion reactor down. In addition, the thermocouples 10 send a command to open an exit valve 7 which leads to an exit channel. The air hydrogen mixture in the mixing and distributing area preferentially flows through open exit valve 7 to the exit channel 11 where the residual hydrogen is combusted on the catalyst lined wall. This is because there is less resistance pressure in channel 11 than in the combustion chambers and the exit channel 11 will ensure the pressure differential.

Any hydrogen containing liquid that can be easily dehydrogenated may be used in this heater; however, it is preferred to use methylcyclohexane because it and its decomposition product toluene are easy to handle, non-toxic, and the dehydrogenation reaction can be catalyzed without significant side reactions. Decalin is another exemplary material.

The semipermeable membrane 39 can be made of any material through which only hydrogen can diffuse. Preferably the semipermeable membrane is a palladium membrane as this is hydrogen selective and readily available. Typically, its thickness is about 0.01 millimeters (mm) to about 10 mm. The particular thickness is a design parameter. Depending on the application, the thickness may vary to afford different diffusion rates. Those skilled in the art can readily determine the appropriate thickness using a source such as "Diffusion In and Through Solids" by Richard M. Barrer, Chapter 5 which is hereby incorporated by reference. Barrer describes the permeation velocity of hydrogen through metals like palladium.

For the ambient temperature conditions under which the oxidation process is occurring (typically below about 400° C.) the catalysts used for automotive exhaust gas clean-up are adequate. Thus, it is preferable that the catalysts comprise a small fraction of a platinum family metal on an aluminum substrate as this promotes oxidation of hydrogen at a low temperature, is efficient, and readily available. It is especially preferred that a platinum/iridium catalyst is used. The catalyst layer can range from a discontinuous layer to about 0.5 mm in thickness that can be bonded to, for example, metal. It is especially preferred that the surface area of the catalyst is large resulting in many active sites and that the catalyst layer is thin allowing for the easy diffusion to all catalyst sites. It is also possible to vary the above arrangement by placing the catalyst on the semipermeable membrane with a layer of ceramic between the catalyst and semipermeable membrane. The ceramic layer and its thickness, in addition to the permeabilities of the various layers, are selected to provide the desired rate of hydrogen diffusion heat transfer, and consequently hydrogen combustion.

The above catalysts would also be suitable for the decomposition catalysts. Preferably a platinum family metal is used as the decomposition catalyst. The wick can be made of any suitable porous metallic screen, felt or foam, or from sintered metals. Examples are nickel foam and felt, stainless-steel mesh screens, and sintered copper. Fine grooves and arteries can be used to assist the capillary flow in the wick as is well known to those experienced in the art (cf. P. Dunn and D. A. Reay, *Heat Pipes*, Pergamon, 1982 which is hereby incorporated by reference.

These heaters operate at moderate temperatures and provide the direct heating of air eliminating heat exchange losses. In addition, the reaction product of the oxidation of hydrogen is water which eliminates the pollution associated with conventional heating systems. This system uses a regenerable readily available fuel that is easier to handle than metal hydrides. This catalytic hydrogen heater can be used to advantage in a number of situations such as remote sites removed from conventional energy sources such as submarines, oil fields and battle field stations where the low temperature operation can eliminate hotspots that are detectable. In addition, it can be used in chemical plants where it can take advantage of available hydrogen that is presently flared. This system's lack of pollution eliminates vents in present systems that exhaust heat and pollutants. Thus this hydrogen system makes a significant advance in the field of heating systems.

It should be understood that the invention is not limited to the particular embodiments shown and described herein, but that various changes and modifications may be made without departing from the spirit and scope of this novel concept as defined by the following claims.

We claim:

1. An apparatus for heating comprising
   a. a fuel storage means including a hydrogen containing liquid fuel;
   b. a wall means including a hydrogen reduction catalyst for decomposition of the fuel into hydrogen and other decomposition products, a semipermeable membrane through which hydrogen may pass and an oxidation catalyst thereon forming a combustion area for combustion of the hydrogen;
   c. a displacement means for transferring said fuel to said reduction catalyst, said reduction catalyst being proximate to said combustion area whereby combustion heat effects the release of hydrogen from the fuel;
   d. means for controllably supplying air to said combustion area;

e. a condensing means for condensing said other decomposition products; and
f. means for transferring said other decomposition products to said condensing means.

2. The apparatus as recited in claim 1 wherein said displacement means comprises a wick.

3. The apparatus as recited in claim 2 wherein said wick has perforations for transferring said other decomposition products to said condensing means.

4. The apparatus as recited in claim 1 wherein said fuel comprises methyl cyclohexane.

* * * * *